United States Patent [19]

Keskey et al.

[11] Patent Number: 4,690,995

[45] Date of Patent: Sep. 1, 1987

[54] COPOLYMERS CONTAINING HIGH CONCENTRATIONS OF PHENOL ANTIOXIDANT UNITS

[75] Inventors: William H. Keskey, Midland; Mark R. Johnson, Breckenridge, both of Mich.

[73] Assignee: The Dow Chemical Company, Midland, Mich.

[21] Appl. No.: 741,997

[22] Filed: Jun. 6, 1985

[51] Int. Cl.$^4$ ............... C08F 220/40; C08F 220/38; C08F 220/36; C08F 220/28; C08F 220/58; C08F 220/68; C08F 220/70

[52] U.S. Cl. ................... 526/286; 525/68; 525/193; 525/212; 525/217; 525/221; 525/231; 525/291; 525/293; 526/288; 526/289; 526/301; 526/302; 526/304; 526/313; 526/329.5; 526/328.5

[58] Field of Search .......... 525/66, 68, 212, 217, 525/221, 231, 193, 291, 298; 526/286, 288, 289, 301, 302, 304, 313, 317.1, 329.5, 328.5; 568/54, 51, 607, 658

[56] References Cited

U.S. PATENT DOCUMENTS

| | | | |
|---|---|---|---|
| 2,801,980 | 8/1957 | Spacht | 526/313 |
| 3,215,759 | 11/1965 | Milionis et al. | 260/870 |
| 3,246,039 | 4/1966 | Reifschneider | 568/54 |
| 3,290,270 | 12/1966 | Goldberg et al. | 260/47 |
| 3,317,462 | 5/1967 | Goldberg et al. | 260/47 |
| 3,418,397 | 12/1968 | Tocker | 260/900 |
| 3,423,360 | 1/1969 | Huber et al. | 260/47 |
| 3,457,328 | 7/1969 | Blatz et al. | 526/313 |
| 3,477,991 | 11/1969 | Patton et al. | 526/313 |
| 3,573,253 | 3/1971 | Gray | 260/47 |
| 3,627,831 | 12/1971 | Huber-Emden | 526/313 |
| 3,629,197 | 12/1971 | Stiehl | 260/47 |
| 3,645,970 | 2/1972 | Kleiner | 526/313 |
| 3,657,175 | 4/1972 | Zimmerman | 260/29.6 T |
| 3,714,122 | 1/1973 | Kline | 260/62 |
| 3,723,405 | 3/1973 | Kaplan et al. | 260/45.9 |
| 3,798,274 | 3/1974 | Moore et al. | 568/54 |
| 3,849,373 | 11/1974 | Siegle et al. | 525/328.2 |
| 3,894,980 | 7/1975 | DeTommaso | 260/29.6 RW |
| 3,951,915 | 4/1976 | Keck et al. | 260/47 C |
| 3,953,402 | 4/1976 | Kline | 526/313 |
| 3,962,187 | 6/1976 | Kline | 526/313 |
| 3,986,981 | 10/1976 | Lyons | 252/404 |
| 3,996,198 | 12/1976 | Wang et al. | 260/62 |
| 4,010,140 | 3/1977 | Bullard et al. | 525/217 |
| 4,028,342 | 6/1977 | Dale et al. | 526/313 |
| 4,032,598 | 6/1977 | Fujiwara et al. | 260/47 |
| 4,054,676 | 10/1977 | Weinshenker et al. | 260/45.95 |
| 4,080,211 | 3/1978 | Van Paesschen et al. | 526/303 |
| 4,097,464 | 6/1978 | Kline | 526/313 |
| 4,107,144 | 8/1978 | Russell et al. | 526/212 |
| 4,138,380 | 2/1979 | Barabas et al. | 260/29.6 Z |
| 4,138,389 | 2/1979 | Edwards | 526/56 |
| 4,155,955 | 5/1979 | Parks | 260/879 |
| 4,165,333 | 8/1979 | Kline | 526/286 |
| 4,182,803 | 1/1980 | Kanagawa et al. | 526/313 |
| 4,207,109 | 6/1980 | Campbell et al. | 526/323 |
| 4,207,253 | 6/1980 | Lorenz et al. | 260/465 |
| 4,213,892 | 7/1980 | Scott | 525/384 |
| 4,218,392 | 8/1980 | Lorenz et al. | 260/465 |
| 4,267,365 | 5/1981 | Findeisen | 560/205 |
| 4,268,641 | 5/1981 | Koenig et al. | 525/367 |
| 4,279,809 | 7/1981 | Allan et al. | 525/154 |
| 4,281,192 | 7/1981 | Jacquet et al. | 528/291 |
| 4,292,195 | 9/1981 | Morris | 525/504 |
| 4,307,012 | 12/1981 | Serres, Jr. | 525/384 |
| 4,310,657 | 1/1982 | Serres, Jr. | 528/212 |
| 4,355,148 | 10/1982 | Layer et al. | 526/281 |
| 4,514,552 | 4/1985 | Shay et al. | 526/301 |
| 4,540,739 | 7/1985 | Midgley | 524/764 |

FOREIGN PATENT DOCUMENTS

| 808737 | 3/1969 | Canada . |
| 2450504A1 | 5/1976 | Fed. Rep. of Germany . |
| 56-118730 | 2/1980 | Japan . |
| 1226685 | 3/1971 | United Kingdom . |
| 1498707 | 1/1978 | United Kingdom . |

OTHER PUBLICATIONS

Meyer, G. E. et al–J. Rubber Chem. & Tech., vol. 46, No. 1, 106–114 (1973).

Hackh's Chemical Dictionary: 4th Edition (1969), pp. 34, 35, 131, 248 & 675.

*Emulsion Polymerization*: D. C. Blackley (1975), pp. 298–301.

Chemical Abstracts: 76:142095c; 81:92669y; 82:17582g; 84:136079z; 93:133082v; 94:157330w; 96:163300u; and 97:24366c.

Derwent Abstracts: 58308B/32 and 34859K/15.

M. Kato and Y. Takemoto, *J. Polymer Science B.* 10, 157–159 and 489–1491 (1972): β-Vinyloxy (3,5-Di--Tertbutyl-4-Hydroxy) Benzoate was Copolymerized.

R. H. Kline and J. P. Miller, *Rubber Chem. Technol.* 46, 96–105 (1973): Hindered Phenol alkylene acrylates and acrylamides were made.

A. H. Weinstein, *Rubber Chem. Technol.*, 50, 641–649 and 650–659 (1977): Aromatic Disulfides are incorporated by chain transfer reactions.

*Condensed Chemical Dictionary*, (8th ed., 1971), p. 355.

R. Morrison and R. Boyd, *Organic Chemistry*, (2d ed., 1966), pp. 467, 590–591, 601–603, 669, 671, 921–922.

K. Saunders, *Organic Polymer Chemistry*, (1973), pp. 325–328.

J. Roberts and M. Caserio, *Basic Principles of Organic Chemistry*, (1965), pp. 752–755.

*Primary Examiner*—Veronica P. Hoke

[57] ABSTRACT

Copolymers comprising 0.10 to 50 parts by weight of hindered phenol antioxidant monomer and at least 10 to 60 parts by weight of at least one unsaturated carboxylic acid monomer are prepared, preferably in emulsion polymerization systems.

31 Claims, No Drawings

COPOLYMERS CONTAINING HIGH CONCENTRATIONS OF PHENOL ANTIOXIDANT UNITS

BACKGROUND OF THE INVENTION

This invention generally relates to stabilizing compositions of matter, compositions comprising stabilizing compounds and processes for preparing stabilizing compounds and compositions. More particularly, the invention relates to polymeric compositions which are stabilized against the effects of oxidation or aging by the incorporation of phenolic antioxidant monomers into the polymer to be stabilized or into compatible stabilizing copolymers.

A wide variety of oxidation stabilizers have been used for polymer-containing compositions, including amines, phenols, phosphites, sulfides, and metal salts. Hindered phenol antioxidants are frequently preferred because of their relatively slight tendency to stain or discolor. Compatibility with the variety of systems to be stabilized against oxidation has become an important factor. There is the need to overcome the tendencies of the antioxidant to migrate, evaporate, or separate from such systems as solid polymers or to form localized concentrations, especially when processing involves heating, melting or exposure to leaching conditions like dry cleaning solvents, water, washing, weather or other forces which would encourage depletion of the antioxidant from the protected system.

To control migration, evaporation and leaching in polymer systems it has been considered desirable to bind the antioxidants into the polymers either by copolymerization or, more often by grafting. It has, however, proven difficult to retain the activity of the monomer when it is polymerized, or to include enough antioxidant in the copolymer or graft polymer to achieve the desired stabilizing effects. Antioxidants like hindered phenols tend to be free radical scavengers or inhibitors; thus, they tend to inhibit free radical polymerization. Producing copolymers of hindered phenol monomers has often proven complex and expensive. Addition copolymers of most hindered phenol antioxidant monomers have been limited to less than about 10 percent antioxidant monomer (see U.S. Pat. No. 3,627,831, H. Huber-Emden, et al., Dec. 14, 1971; and *Rubber Chem. Tech.*, 46, pp. 96–105, 106–114 (1973); R. Levy, *Rev. Gen. Caout, Plast.*, 51(4), pp. 243–247 (1974).

Various approaches to forming the desired polymers with antioxidant properties while avoiding their polymerization inhibiting effects have included grafting or otherwise reacting antioxidant compounds with already formed polymers, blocking the free radical inhibiting functional groups during polymerization and later removing the blocking group, or using catalysts which do not require free radical formation, such as transition metals, acids or base catalysts. Some approaches have involved carbene or chain transfer mechanisms that resulted in the phenolic ring being part of the polymer backbone rather than being an active pendant group.

Only a small portion of the approaches to solving the problems of forming antioxidants in polymeric form involve the use of antioxidant monomers having addition polymerizable unsaturation because these compounds have been difficult to make and purify as well as to polymerize in concentrations sufficient to impart antioxidant function to systems in which they might be used.

Concentrations of active antioxidant monomers in copolymers in excess of 10 percent would be useful not only to protect the polymer chains in which they are incorporated against oxidation, but also to protect other components in systems in which the antioxidant copolymers might be incorporated. They would be particularly useful in forms compatible with the systems to be stabilized against oxidation, especially in latex compositions which are sensitive to separation and other effects from the addition of incompatible compounds. Emulsion polymerization would produce such compatible forms of antioxidant polymers and would allow a high solids content and lower viscosity (therefore, easier handling) than polymers produced in solution systems. Unfortunately, it has proven particularly difficult to incorporate the needed quantities of antioxidant monomers in polymers produced in emulsion systems.

Solution polymerization systems in which copolymers containing at least about 10 percent antioxidant phenol monomers have been reported to involve heterocyclic, carbonyl, amide, acid, ester or other electron-attracting or conjugating functional groups directly on or in conjugational relationship to the phenol ring. Specifically, benzoic and cinnamic acid derivatives, benzophenone compounds and acrylamido-, acryloxy-, and acryloyloxy-phenols have been used. Benzoate diesters with unsaturated acid monomers containing hindered hydroxyl groups have been reported to be polymerizable in emulsion systems (U.S. Pat. No. 3,645,970, E. K. Kleiner, Feb. 29, 1972). It is known, however, that electron-attracting groups decrease the efficiency of hindered phenol antioxidants. See *Encyclopedia of Polymer Science and Technology*, Vol. 2, p. 176 (1965).

In U.S. application Ser. No. 298,688, filed Sept. 2, 1981, Mark R. Johnson taught an improved method of producing an addition polymerizable antioxidant with high activity, which need not have electron-attracting groups on the phenolic ring. In the pertinent part, this process employs an unsaturated isocyanatoalkyl ester reacted with an active hydrogen of an antioxidant compound to form a urethane type of linkage. The reaction product has unsaturation for addition polymerization as well as the active antioxidant functionality. Even that application did not disclose how to incorporate high levels of antioxidant monomers.

Unexpectedly, it has been observed that the inclusion of at least one unsaturated carboxylic acid monomer in a copolymer facilitates incorporation of antioxidant monomers into the copolymer, especially when the copolymer is produced in an emulsion system. Surprisingly, relatively high proportions, specifically at least 10 percent by weight, of antioxidant may be included in the copolymer chain using the same polymerization techniques that have proven effective for monomers which do not inhibit oxidation or polymerization when at least 15 percent by weight of an unsaturated carboxylic acid monomer is used. The antioxidant monomers may be present in amounts from 0.01 to 50 weight percent.

Such a result is particularly surprising in light of the fact that phenols, particularly branched lower alkyl substituted phenols are known to inhibit the polymerization of acrylic acid. See U.S. Pat. Nos. 3,888,927, L. B. Levy and G. F. Fisher, June 10, 1975 and 4,267,365, K. Findelsen, May 12, 1981.

When unsaturated active phenol antioxidant monomers have been incorporated into polymer systems (albeit in low concentrations) the polymer systems have generally been rubber systems like styrene-butadiene. Unsaturated acid monomers have not generally been present. Some examples in U.S. Pat. No. 3,627,831 did include about 5 percent acrylic acid, however.

SUMMARY OF THE INVENTION

In one aspect, the present invention is an oxidation resistant composition of matter comprising an emulsion polymerized monomer system comprising (A) 0.10 to 50 parts by weight per hundred parts by weight of total monomer of at least one hindered phenol antioxidant monomer having an addition polymerizable double bond of the formula:

$$\text{Ph-A1-D} \quad \quad (I)$$

wherein Ph is a hindered phenol group having at least one alkyl substituent, preferably a branched or cyclic lower alkyl substituent of at least 3 carbon atoms ortho to the hydroxyl group; D is an acyclic substituent having an addition polymerizable double bond which substituent may include ether, thioether, ester, thioester, amide, urethane-type linkages, or carbamate functional groups; and A1 is $(CH_2)_k$, $-S-$, $-O-$, $-CH_2O-$, $-CH_2S-$, where k is 1 or 2 and (B) at least 15 to 60 parts by weight of at least one unsaturated carboxylic acid monomer.

In another aspect, the invention is the process of producing an oxidation resistant composition of matter comprising emulsion polymerizing a monomer system comprising (A) 0.10 to 50 parts by weight per hundred parts by weight of total monomer of at least one hindered phenol antioxidant monomer having an addition polymerizable double bond of the formula:

$$\text{Ph-A1-D} \quad \quad (I)$$

wherein Ph, A1, and D are defined above and (B) at least 15 to 60 parts by weight of at least one unsaturated carboxylic acid monomer.

DETAILED DESCRIPTION OF THE INVENTION

A. Hindered Phenol Monomer

The antioxidant compositions of matter of the invention generally comprise (A) 0.10 to 50 parts by weight per hundred parts by weight of total monomer of at least one hindered phenol antioxidant monomer having an addition polymerizable double bond of the formula:

$$\text{Ph-A1-D} \quad \quad (I)$$

wherein Ph, A1, and D are described above; and (B) at least 15 to 60 parts by weight of at least one unsaturated carboxylic acid monomer.

In Formula I above Ph is preferably:

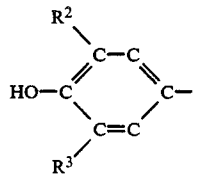

(II)

wherein $R^2$ is an alkyl group, preferably a branched or cyclic alkyl group of at least three carbon atoms; $R^3$ is a hydrogen or an alkyl group, preferably a branched or cyclic alkyl group of at least three carbon atoms, such that the hydroxyl group is sufficiently hindered to have antioxidant function; and D is preferably an acyclic substituent of the formula:

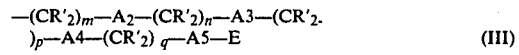
(III)

wherein each A2, A3, A4, A5 is independently selected from the group consisting of a thioether, an ether, a carboxylic acid ester, a thioester, a carboxylic acid amide, a urethane-type linkage and nothing; m, n, p, and q are independently integers of from zero to 4, but where A1 is $-O-$ or $-S-$, m is not zero and is preferably 2, 3, or 4; each R' is independently H or a (substituted) alkyl group, preferably H or a 1 to 2 carbon alkyl group; and E is a group having addition polymerizable unsaturation, preferably an alkenyl group of the formula:

wherein $R^4$ is a divalent alkyl group of one to four carbon atoms or when at least one of A2, A3, A4 or A5 is a thioether, an ether, a carboxylic acid ester, a thioester, a carboxylic acid amide or a urethane-type linkage, R4 may be nothing; each of $R^5$, $R^6$, and $R^7$ are independently chosen from the group consisting of H or alkyl group of one to four carbon atoms such that the double bond is addition polymerizable, more preferably, E is

and most preferably E is $-CR^8=CH_2$ where $R^8$ is $-CH_3$ or H.

Preferably, at least two of A2, A3, A4, and A5 are carboxylic acid ester, thioester, carboxylic amide, or urethane-type linkages.

Preferred compounds include those of Formula III wherein A1 is $-S-$ or $-(CH_2)_k-$ and k is 2 and m is 2, 3, or 4; those wherein A2 is a carboxylic ester or amide group, in which cases it is especially preferred that n and/or m be 2; those wherein A3 is a urethane-type linkage, in which case it is especially preferred that p be 2; and those wherein A4 is a carboxylic ester or amide group, in which cases it is especially preferred that p and/or n be 2. When A2, A3, and A4 are defined as above, A5 is preferably nothing and q is preferably zero.

Specifically, when A1 is $-S-$, A2 may be a carboxylic acid ester group; A3 may be a urethane group; A4 may be a carboxylic acid ester group. The hindered phenol group Ph may be a 2,6-dialkyl phenol, specifically a 2,6-ditertiarybutyl phenol. M, n, p may be 2 while A5 is nothing, q is zero, and R is H. This compound would be O-[2-ethyl(3,5-di-tert-butyl-4-hydroxyphenyl-3-thiopropanoate], N-(2-ethyl methacrylate)-carbamate (henceforth referred to as TBPTMC) also known as 2-(((2-(3-((3,5-bis(1,1-dimethylethyl)-4-hydroxyphenyl)thio)1-(oxopropoxy) ethoxy)carbonyl-)amino)ethyl 2-methyl 2-propenoate and the formula would be:

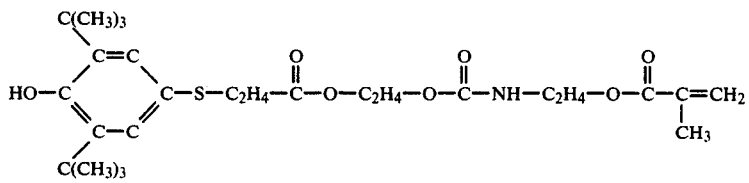

IV

The preparation of the above compound and similar hindered phenol antioxidants having thioalkanoate substituents which may be further substituted with urethane and addition polymerizable carboxylic ester groups were disclosed by M. R. Johnson and M. Fazio in U.S. application Ser. No. 579,237, filed Feb. 13, 1984, now abandoned which is incorporated by reference. A wider range of hindered phenol antioxidants having addition polymerizable unsaturation in their side chains and which are useful in this invention may be prepared by the reaction of an antioxidant having an active hydrogen and an isocyanatoalkyl ester of an ethylenically unsaturated carboxylic acid as is disclosed by M. R. Johnson in U.S. application Ser. No. 298,688, filed Sept. 2, 1984, which is incorporated by reference. That application states the definition of urethane-type linkage employed herein: the term urethane-type linkage is meant to include not only a true urethane linkage wherein an isocyanate is reacted with an organic hydroxyl group, but also to include the reaction of an isocyanate with any active hydrogen moiety (generally any hydrogen moiety which will react with an isocyanate group, including, for example, amines, alcohols, thiols, carboxylic acids and carboxamides). Neither application taught copolymers of those compounds with addition polymerizable carboxylic acid monomers, nor incorporation of high concentrations of antioxidant monomers in copolymers.

Specific examples of useful addition polymerizable hindered phenol to which the invention is not limited are O-[2-ethyl(3,5-di-tert-butyl, 4-hydroxyphenyl-3-thio-propanoate)], N-(2-ethyl methacrylate) carbamate;
O-[2-ethyl(3,5-di-tert-butyl, 4-hydroxyphenyl-3-thio-propanoate)], N-(2-ethyl methacrylate) carbamate;
O-[2-ethyl(3,5-di-iso-butyl, 4-hydroxyphenyl-3-thio-propanoate)], N-(2-ethyl acrylate) carbamate;
O-[2-ethyl(3,5-di-iso-butyl, 4-hydroxyphenyl-3-thio-propanoate)], N-(2-ethyl acrylate) carbamate;
O-[2-ethyl(3,5-di-tert-butyl, 4-hydroxyphenyl-3-thio-propanoate)], N-(methyl acrylate) carbamate;
O-[2-ethyl(3,5-di-tert-butyl, 4-hydroxyphenyl-3-thio-propanoate)], N-(methyl methacrylate) carbamate;
O-[2-ethyl(3,5-di-tert-butyl, 4-hydroxyphenyl-3-thio-propanoate)], N-(2-propyl acrylate) carbamate;
O-[2-ethyl(3,5-di-tert-butyl, 4-hydroxyphenyl-3-thio-propanoate)], N-(2-propyl methacrylate) carbamate;
O-[2-ethyl(3,5-di-tert-butyl, 4-hydroxyphenyl-3-thio-propanoate)], N-(3-propyl acrylate) carbamate;
O-[2-ethyl (3,5-di-tert-butyl, 4-hydroxyphenyl-3-thio-propanoate)], N-(3-propyl methacrylate) carbamate;
O-[2-ethyl(3,5-di-tert-butyl, 4-hydroxyphenyl-3-thio-2-methylpropanoate)], N-(2-ethyl acrylate) carbamate;
O-[2-ethyl(3,5-di-tert-butyl, 4-hydroxyphenyl-3-thio-2-methylpropanoate)], N-(2-ethyl methacrylate) carbamate;
O-[2-ethyl(3,5-di-iso-butyl, 4-hydroxyphenyl-3-thio-2-methylpropanoate)], N-(2-ethyl acrylate) carbamate;
O-[2-ethyl(3,5-di-iso-butyl, 4-hydroxyphenyl-3-thio-2-methylpropanoate)], N-(2-ethyl methacrylate) carbamate;
O-[2-ethyl(3,5-di-tert-butyl, 4-hydroxyphenyl-3-thio-2-methylpropanoate)], N-(2-methyl acrylate) carbamate;
O-[2-ethyl(3,5-di-tert-butyl, 4-hydroxyphenyl-3-thio-2-methylpropanoate)], N-(methyl methylacrylate) carbamate;
O-[2-ethyl(3,5-di-tert-butyl, 4-hydroxyphenyl-3-thio-2-methylpropanoate)], N-(2-propyl acrylate) carbamate;
O-[2-ethyl(3,5-di-tert-butyl, 4-hydroxyphenyl-3-thio-2-methylpropanoate)], N-(2-propyl methacrylate) carbamate;
O-[2-ethyl(3,5-di-tert-butyl, 4-hydroxyphenyl-3-thio-2-methylpropanoate)], N-(3-propyl acrylate) carbamate;
O-[2-ethyl(3,5-di-tert-butyl, 4-hydroxyphenyl-3-thio-2-methylpropanoate)], N-(3-propyl methacrylate) carbamate.

While the range of the polymerizable hindered phenol antioxidant monomers present may be from 0.1 to 50 parts by weight to 100 parts by weight of total monomers present, preferably there is at least 10 parts by weight of the polymerizable hindered phenol antioxidant monomer incorporated in the copolymer with the unsaturated carboxylic acid monomer. More preferably at least 15 parts by weight or at least 20 parts by weight of the antioxidant phenol monomer will be incorporated in the copolymer with the unsaturated acid monomer.

B. Carboxylic Acid Monomer

The emulsion polymer requires about 15 to 60 weight percent based on total monomers present of a three to eight carbon α,β-ethylenically unsaturated carboxylic acid monomer of the formula:

   RCH=CR'—COOH   V wherein R is H and R' is H or a one to four carbon alkyl group, or —CH$_2$COOX; or R is —CH$_2$COOX and R' is H or —CH$_2$COOX; or R is —CH$_3$ and R' is H; and X is H or a 1 to 4 carbon alkyl group.

Acrylic or methacrylic acid or a mixture thereof with itaconic or fumaric acid are preferred, but crotonic and aconitic acid and half esters of these and other polycarboxylic acids such as maleic acid with 1 to 4 carbon alkanols are also suitable, particularly if used in minor amounts in combination with acrylic or methacrylic acid. For most purposes, it is preferable to have at least about 15 weight percent, more preferably at least about 20 weight percent, and most preferably from about 25 to 60 weight percent of the unsaturated carboxylic acid monomer. However, polycarboxylic acid monomers and half esters can be substituted for a portion of the acrylic or methacrylic acid, e.g., about 1 to 15 weight percent based on total monomers.

C. Other Monomers

The active antioxidant polymers may be made up entirely of hindered phenol and carboxylic acid monomers, but in most of these compositons there will be at least one additional copolymerizable nonionic 2 to 12 carbon α,β-ethylenically unsaturated monomer selected from the group consisting of the formula:

$$CH_2=CYZ \qquad VI$$

where Y is H and Z is —COOR, —C$_6$H$_4$R', —CN, —Cl, —OCOR", or —CH=CH$_2$; or Y and Z are Cl; and R is 1 to 8 carbon alkyl or 2 to 8 carbon hydroxyalkyl; R' is H, Cl, Br, or 1 to 4 carbon alkyl; R" is one to 8 carbon alkyl.

Typical of such monomers are the 1 to 8 carbon alkyl and 2 to 8 carbon hydroxyalkyl esters of acrylic and methacrylic acids including, methyl acrylate, ethyl acrylate, propyl acrylate, butyl acrylate, methyl methacrylate, ethyl methacrylate, propyl methacrylate, butyl methacrylate, 2-ethylhexyl acrylate, 2-hydroxyethyl acrylate, 2-hydroxybutyl methacrylate, 2-ethylhexyl methacrylate, 2-hydroxyethyl methacrylate, styrene, vvinyltoluene, t-butylstyrene, isopropylstyrene, and p-chlorostyrene; vinylacetate, vinylbutyrate, vinylcaprolate; acrylonitrile, methacrylonitrile, butadiene, isoprene, vinyl chloride, vinylidene chloride, and the like. In practice, a monovinyl ester such as ethylacrylate or a mixture thereof with styrene, hydroxyethylacrylate, acrylonitrile, vinyl chloride or vinylacetate is preferred.

D. Copolymerization

The novel emulsion copolymers are conveniently prepared from the above-described monomers by conventional emulsion polymerization techniques at an acid pH lower than about 5.0 using free radical producing initiators, usually in amounts from 0.01 percent to 3 percent based on the total weight of the monomers. The free radical producing initiators conveniently are peroxygen compounds especially inorganic persulfate compounds such as ammonium persulfate, potassium persulfate, sodium persulfate; peroxides such as hydrogen peroxide; organic hydroperoxides, for example cumene hydroperoxide, t-butyl hydroperoxide; organic peroxides, for example, benzoyl peroxide, acetyl peroxide, lauroyl peroxide, peracetic acid, and perbenzoic acid (sometimes activated by water soluble reducing agent such as a ferrous compound or sodium bisulfite); as well as 2,2'-azobisisobutyronitrile.

Optionally, a chain transfer agent and an additional emulsifier can be used. Representative chain transfer agents are carbon tetrachloride, bromoform, bromotrichloromethane, long chain alkyl mercaptans and thioesters such as n-dodecyl mercaptan, t-dodecyl mercaptan, hexadecyl mercaptan, octyl mercaptan, tetradecyl mercaptan, butyl thioglycolate, isooctyl thioglycolate, and dodecyl thioglycolate. The chain transfer agents are used in amounts up to about 10 parts per 100 parts of polymerizable monomers.

Often at least one anionic emulsifier is included in the polymeric charge and one or more of the known nonionic emulsifiers may also be present. Examples of anionic emulsifiers are the alkali metal alkyl aryl sulfonates, the alkali metal alkyl sulfates and the sulfonated alkyl esters. Specific examples of these well known emulsifiers are sodium dodecylbenzene sulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate.

Optionally, other ingredients well known in the emulsion polymerization art may be included as chelating agents, buffering agents, inorganic salts and pH adjusting agents.

Polymerization at an acid pH lower than about 5.0 permits direct preparation of an aqueous collodial dispersion with relatively high solids content without problems of undue viscosity.

Usually the copolymerization is carried out at a temperature between about 60° and 90° C. but higher or lower temperatures may be used. The polymerization is carried out batchwise, stepwise or continuously with batch and/or continuous addition of the monomers in a convenient manner.

After the reaction the product latex may be cooled and filtered. It may be mixed with another latex or polymer composition or used alone. The latexes may be used as coatings. Films of these compositions may be cast or solid polymers may be formed by other processes like foaming or molding. Such compositions have a high degree of oxidation resistance as is shown in the examples below.

The following examples are presented to further illustrate but not limit the scope of this invention. All parts and percentages are by weight unless otherwise indicated.

EXAMPLE 1

To a preheated solution of 0.0075 parts by weight of sodium diethylenetriamine pentaacetic acid (Versenex 80 ®) and 2 parts nonylphenoxypoly(ethyleneoxy) phosphate ester emulsifier (GAFAC RE 610 ®) in 374.35 parts of water were added a monomer mixture and an aqueous mixture, concurrently over a period of 4 hours. The monomer mixture was 40 parts by weight of ethyl acrylate, 50 parts methacrylic acid, 10 parts by weight 2-(((2-(3-((3,5-bis(1,1-dimethylethyl)-4-hydroxyphenyl) thio)-1-oxypropoxy)ethoxy)carbonyl)amino)ethyl 2-methyl 2-propenoate (henceforth called TBPTMC), and 6 parts nonylphenoxypoly(ethyleneoxy)$_5$ ethanol (IGEPAL CO-530 ®). The aqueous mixture was 69.8 parts by weight water with 0.002 parts of a 1 percent solution of sodium diethylenetriamine pentaacetic acid (Versenex 80 ®) and 1 part nonyl-phenoxypoly(ethyleneoxy) phosphate ester emulsifier (GAFAC RE 610 ®), 2 parts sodium dodecyldiphenyl ether disulfonate (Dowfax 2A1) in a 45 percent solution, 0.5 parts sodium persulfate and 0.4 parts sodium hydroxide. Agitation, a nitrogen purge and a temperature of 80° C. were maintained. All parts are by weight and represent parts per 100 parts of monomers in the composition.

After a post reaction period of 1.5 hours, the reactor was cooled. The product was removed and filtered through a 200 mesh screen. The resulting latex had a solids content of 19.7 percent. This represented about 99 percent conversion based on solids charged to the system.

EXAMPLE 2

The emulsion polymerization process of Example 1 was repeated for a monomer mixture of 25 parts by weight of ethyl acrylate, 50 parts by weight of methacrylic acid, 6 parts nonylphenoxypoly(ethyleneoxy)$_5$ ethanol (IGEPAL CO-530 ®), and 25 parts TBPTMC.

EXAMPLE 3

The emulsion polymerization process of Example 1 was repeated for a monomer mixture of zero parts by weight of ethyl acrylate, 50 parts by weight of methacrylic acid, 6 parts nonylphenoxypoly(ethyleneoxy)$_5$ ethanol (IGEPAL CO-530 ®), and 50 parts TBPTMC.

EXAMPLE 4

Control, for Comparison Only

The emulsion polymerization process of Example 1 was repeated for a monomer mixture of 50 parts by weight of ethyl acrylate, 50 parts by weight of methacrylic acid, 6 parts nonylphenoxypoly(ethyleneoxy$_5$ ethanol (IGEPAL CO-530 ®)) with no hindered phenol monomer for comparison of this polymer which is not an example of the invention with those which are.

EXAMPLE 5

A 149.8 g sample of Dow Latex XD-30553.01 containing 2.0 percent itaconic acid with no antioxidant present was diluted with 50.2 g water to give a 40 percent solids latex. The pH was adjusted to 9.0 with 28 percent NH$_4$OH. A 4.06 g portion of the product latex of Example 1 was added to the diluted latex, giving a latex with 0.1 percent active antioxidant in the polymers.

The pH was adjusted to 8.5 using NH$_4$OH. The viscosity measured with a LVT Brookfield Viscometer (#3. spindle) was 2220 cps at 12 RPM and 1124 cps at 30 RPM. A film was cast on a glass plate. An accelerated aging study was conducted by heating the film at 130° C. in a forced air oven and observing the yellowing and embrittlement of the film. This film became brittle in the 48th through 60th hours.

EXAMPLE 6

The procedure of Example 5 was repeated using 4.17 g of the product of Example 2 in place of the product of Example 1. The resulting latex had 0.25 percent active antioxidant. At a pH of 8.5 the viscosity of the combined latex measured as in Example 5, was 260 cps at 12 RPM and 220 cps at 30 RPM. The film cast as in Example 5 became brittle in the 48th through 60th hours.

EXAMPLE 7

The procedure of Example 5 was repeated using 4.50 g of the product of Example 3 in place of the product of Example 1. The resulting latex had 0.50 percent active antioxidant. At a pH of 8.5 the combined latex had a viscosity, measured as in Example 5, of 290 cps at 12 RPM and 160 cps at 30 RPM. The film cast as in Example 5 became brittle in the 48th through 60th hours.

EXAMPLE 8

For Comparison

The procedure of Example 5 was repeated using 4.06 g of the product of Example 4 in place of the product of Example 1. The resulting latex had no active antioxidant monomer. At a pH of 8.5 the combined latex had a viscosity, measured as in Example 5, of 3970 cps at 12 RPM and 1976 cps at 30 RPM. The film cast as in Example 5 became brittle in the 24th through 36th hours. Note that this is not an example of the invention and is given only for comparison.

EXAMPLE 9

For Comparison

The procedure of Example 5 was repeated without an antioxidant. The film cast as in Example 5 became brittle in 24 to 36 hours. Note that this example is not an example of the invention and is given only for comparison. The viscosity was not measured.

EXAMPLE 10

The procedure of Example 5 was repeated incorporating 2 percent by weight product of Example 2 in place of the product of Example 1 using Dow Latex DL 852 containing 58.2 percent styrene, 40 percent butadiene, and 1.8 percent itaconic acid. The resulting latex had 0.5 percent active antioxidant. The film was cast as in Example 5.

EXAMPLE 11

The procedure of Example 10 was repeated incorporating 1 percent by weight product of Example 3 in place of the product of Example 2. The resulting latex had 0.5 percent active antioxidant. The film was cast as in Example 5.

EXAMPLE 12

For Comparison

The procedure of Example 10 was repeated incorporating 2 percent of the product of Example 4 in place of the product of Example 2. The resulting latex had no active antioxidant. Note that this is not an example of the invention and is given only for comparison.

EXAMPLE 13

For Comparison

The procedure of Example 10 was repeated using 1 percent Wingstay L ® (the butylated reaction product of p-cresol and dicyclopentadiene) in place of the product of Example 2. The resulting latex had a conventional nonpolymeric antioxidant. Note that this is not an example of the invention and is given only for comparison.

EXAMPLE 14

For Comparison

The procedure of Example 13 was repeated using 1 percent 3-(4-hydroxy-3,5-di-t-butylphenylmercapto) propionic acid in place of the Wingstay L ® of Example 13. The resulting latex had a conventional nonpolymeric antioxidant. Note that this is not an example of the invention and is given only for comparison.

EXAMPLE 15

For Comparison

The procedure of Example 13 was repeated using no antioxidant above. The resulting latex had no active antioxidant. Note that this is not an example of the invention and is given only for comparison.

Yellowing of the Films of Examples 10–15

The films of Examples 10–15 were heated at 130° C. to simulate accelerated aging. Yellowness was observed to be worse for the products of Examples 15 and 12 which contained no antioxidant. The yellowing of the products of the remaining examples was decreasing in the order: Example 14>Example 13>Example 10>Example 11.

The above data demonstrate that the polymers comprising at least 10 parts by weight and up to at least 50 parts by weight of hindered phenol antioxidant monomer having an addition polymerizable ethylenically unsaturated group, and 50 parts by weight of at least one unsaturated carboxylic acid monomer can be prepared and are useful in stabilizing polymer systems. These active antioxidant polymers may be produced in polymerization systems known in the art and are not limited to the ingredients or proportions illustrated in the examples. Rather, the surfactants, emulsifiers, suspension agents, catalysts, bases, or liquid systems in the examples are merely illustrations which may be substituted by similarly functioning compounds. The active antioxidant polymers may be made up entirely of the hindered phenol antioxidant monomer(s) and the carboxylic acid monomer(s) or may contain other monomers copolymerizable with them.

These antioxidant polymers are active whether used alone or whether incorporated into other polymer systems as illustrated. These systems may be used in any form not limited to latex, solution, emulsion, and solid whether shaped or not. They may be used as or in coatings. These systems may be crosslinked or not. They are especially useful where they will be exposed to oxidizing conditions.

We claim:

1. The process of producing an oxidation resistant composition of matter comprising a polymer derived from emulsion polymerizing at a pH lower than about 5.0 a monomer system comprising (a) 20 to 50 parts by weight per hundred parts by weight of total monomer of at least one hindered phenol antioxidant monomer having an addition polymerizable double bond of the formula:

Ph-A1-D wherein Ph is a hindered phenol group having at least one branched or cyclic lower alkyl substituent of at least 3 carbon atoms ortho to the hydroxyl group; A1 is —(CH$_2$)$_k$—, —S—, —O—, —CH$_2$O—, —CH$_2$S—, where k is 1 or 2; and D is an acyclic substituent of the formula:

—(CR'$_2$)$_m$—A2—(CR'$_2$)$_n$—A3—(CR'$_2$)$_p$—A4—(CR'$_2$)$_q$—A5—E wherein each A2, A3, A4 and A5 is independently selected from the group consisting of a thioether, ether, carboxylic acid ester, thioester, carboxylic acid amide, urethane-type linkage and nothing; m, n, p, and q are independently integers of zero to 4, but where A1 is —O— or —S—, m is not zero; each R' is independently H or a (substituted) alkyl group; and E is a group having addition polymerizable unsaturation, and (b) at least 15 to 60 parts by weight of at least one 3 to 8 carbon α,β-ethylenically unsaturated carboxylic acid monomer.

2. The process of claim 1 wherein there are at least 25 parts by weight per hundred parts by weight of total monomer of at least one unsaturated carboxylic acid monomer.

3. The process of claim 1 or 2 wherein Ph is

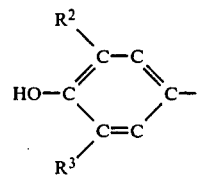

wherein R$^2$ is an alkyl group; R$^3$ is a hydrogen or an alkyl group such that the hydroxyl group is sufficiently hindered to have antioxidant function.

4. The process of claim 1 or 2 wherein Ph is a 2,6-di-tert-butyl phenol group.

5. The process of claim 2 wherein A1 is —S— or —(CH$_2$)$_2$—.

6. The process of claim 1 wherein E is an alkenyl group of the formula: —R$^4$—CR$^5$=CH$_2$ wherein R$^4$ is a divalent alkyl group of 1 to 4 carbon atoms or when at least one of A2, A3, A4, or A5 is an ether, a thioether, a carboxylic ester, a thioester, a carboxylic acid amide, or a urethane-type linkage, R4 may be nothing; and R$^5$ is chosen from the group consisting of H or alkyl group of 1 to 4 carbon atoms such that the double bond is addition polymerizable.

7. The process of claim 1 wherein A1 is —S— or —(CH$_2$)$_2$—.

8. The process of claim 1 wherein at least two of A2, A3, A4, A5 are carboxylic acid ester, thioester, carboxylic amide, or urethane-type linkages.

9. The process of claim 8 wherein A3 is a urethane-type linkage.

10. The process of claim 9 wherein A2 and A4 are independently chosen from the group consisting of carboxylic amides, carboxylic esters and nothing.

11. The process of claim 10 wherein A1 is —S— and m is 2 or A1 is —(CH$_2$)$_2$—.

12. The process of claim 1 or 2 wherein the hindered phenol antioxidant monomer having an addition polymerizable double bond is 2-(((2-(3-((3,5-bis (1,1-dimethyl)-4-hydroxyphenyl)thio)-1-oxopropoxy) ethoxy)-carbonyl)amino)ethyl-2-methyl 2-propenoate.

13. The process of claim 1 or 2 wherein the α,β-ethylenically unsaturated carboxylic acid monomer is of the formula: RCH=CR'—COOH wherein R is H and R' is H or a 1 to 4 carbon alkyl group, or —CH$_2$COOX; or R is —CH$_2$COOX and R' is H or —CH$_2$COOX; or R is —CH$_3$ and R' is H; and X is H or a 1 to 4 carbon alkyl group.

14. The process of claim 1 or 2 wherein the α,β-ethylenically unsaturated carboxylic acid monomer is selected from the group consisting of acrylic acid and methacrylic acid.

15. The process of claim 1 or 2 wherein the emulsion polymerization takes place at a pH of less than about 5.0.

16. An oxidation resistant composition of matter comprising a polymer derived from the emulsion polymerization of a monomer system comprising (A) 20 to 50 parts by weight per hundred parts by weight of total monomer of at least one hindered phenol antioxidant monomer having an addition polymerizable double bond of the formula:

Ph—A1—D wherein Ph is a hindered phenol group having at least one branched or cyclic lower alkyl substituent of at least 3 carbon atoms ortho to the hydroxyl group; A1 is —(CH$_2$)$_k$—, —S—, —O—, —CH$_2$O—, —CH$_2$S—, where k is 1 or 2; and D is an acyclic substituent of the formula:

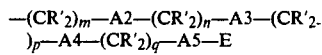

wherein each A2, A3, A4 and A5 is independently selected from the group consisting of a thioether, ether, carboxylic acid ester, thioester, carboxylic acid amide, urethane-type linkage and nothing; m, n, p, and q are independently integers of zero to 4, but where A1 is —O— or —S—, m is not zero; each R' is independently H or a (substituted) alkyl group; and E is a group having addition polymerizable unsaturation, and (b) at least 15 to 60 parts by weight of at least one 3 to 8 carbon α,β-ethylenically unsaturated carboxylic acid monomer, said monomer system having been polymerized at a pH lower than about 5.0.

17. The composition of claim 16 wherein there are at least 25 parts by weight per hundred parts by weight of total monomer of at least one unsaturated carboxylic acid monomer.

18. The composition of claims 16 or 22 wherein Ph is

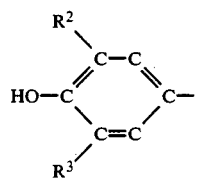

wherein R$^2$ is an alkyl group; R$^3$ is a hydrogen or alkyl group such that the hydroxyl group is sufficiently hindered to have antioxidant function.

19. The composition of claim 18 wherein Ph is a 2,6-di-tert-butyl phenol group.

20. The composition of claim 16, or 17 wherein A1 is —S— or —(CH$_2$)$_2$—.

21. The composition of claim 16 wherein E is an alkenyl group of the formula: —R$^4$—CR$^5$=CH$_2$ wherein R$^4$ is a divalent alkyl group of 1 to 4 carbon atoms or when at least one of A2, A3, A4 or A5 is an ether, thioether, a carboxylic acid ester, a thioester, a carboxylic acid amide or a urethane-type linkage, R$^4$ may be nothing; and R$^5$ is chosen from the group consisting of H or alkyl group of 1 to 4 carbon atoms such that the double bond is addition polymerizable.

22. The composition of claim 16 wherein A1 is —S— or —(CH$_2$)$_2$—.

23. The composition of claim 16 wherein at least two of A2, A3, A4, A5 are carboxylic acid ester, thioester, carboxylic amide, or urethane-type linkages.

24. The composition of claim 23 wherein A3 is a urethane-type linkage.

25. The composition of claim 24 wherein A2 and A4 are independently chosen from the group consisting of carboxylic amides, carboxylic esters and nothing.

26. The composition of claim 25 wherein A1 is —S— and m is 2 or A1 is —(CH$_2$)$_2$—.

27. The composition of claim 16 or 17 wherein the hindered phenol antioxidant monomer having an additional polymerizable double bond is 2-(((2-(3-((3,5-bis(1,1-dimethylethyl)-4-hydroxyphenyl) thio)-1-oxopropoxy)ethoxy)carbonyl)amino)ethyl 2-methyl 2-propenoate.

28. The composition of claim 16 or 17 wherein the α,β-ethylenically unsaturated carboxylic acid monomer is of the formula: RCH=CR'—COOH wherein R is H and R' is H or a 1 to 4 carbon alkyl group, or —CH$_2$COOX; or R is —CH$_2$COOX and R' is H or —CH$_2$COOX; or R is —CH$_3$ and R' is H; and X is H or a 1 to 4 carbon alkyl group.

29. The composition of claim 16 or 17 wherein the α,β-ethylenically unsaturated carboxylic acid monomer is selected from the group consisting of acrylic acid and methacrylic acid.

30. The process of claim 1 wherein the urethane-type linkage is formed by reaction of an isocyanate with a compound selected from the group consisting of amines, alcohols, thiols, carboxylic acids and carboxamides.

31. The process of claim 16 wherein the urethane-type linkage is formed by reaction of an isocyanate with a compound selected from the group consisting of amines, alcohols, thiols, carboxylic acids and carboxamides.

* * * * *